(12) United States Patent
Hirata et al.

(10) Patent No.: US 12,477,542 B2
(45) Date of Patent: Nov. 18, 2025

(54) COMMUNICATION DEVICE AND COMMUNICATION METHOD

(71) Applicant: Sony Group Corporation, Tokyo (JP)

(72) Inventors: Ryuichi Hirata, Tokyo (JP); Yusuke Tanaka, Tokyo (JP); Kazuyuki Sakoda, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 342 days.

(21) Appl. No.: 17/910,369

(22) PCT Filed: Feb. 24, 2021

(86) PCT No.: PCT/JP2021/006949
§ 371 (c)(1),
(2) Date: Sep. 9, 2022

(87) PCT Pub. No.: WO2021/215109
PCT Pub. Date: Oct. 28, 2021

(65) Prior Publication Data
US 2023/0164784 A1   May 25, 2023

(30) Foreign Application Priority Data
Apr. 21, 2020   (JP) .................. 2020-075743

(51) Int. Cl.
*H04W 72/20*   (2023.01)
*H04W 74/0816*   (2024.01)

(52) U.S. Cl.
CPC ....... *H04W 72/20* (2023.01); *H04W 74/0816* (2013.01)

(58) Field of Classification Search
CPC . H04W 72/20; H04W 74/0816; H04W 76/15; H04W 74/002; H04W 84/12
See application file for complete search history.

(56) References Cited

U.S. PATENT DOCUMENTS

2020/0163070 A1\* 5/2020 Shimomura ........ H04W 72/044
2021/0212045 A1\* 7/2021 Cherian ............ H04W 74/0816
(Continued)

FOREIGN PATENT DOCUMENTS

| JP | 2006-303590 A | 11/2006 |
|---|---|---|
| WO | 2016/162988 A1 | 10/2016 |
| WO | WO-2020055016 A1 | 3/2020 |

OTHER PUBLICATIONS

Thomas Handte (Sony), Virtual Carrier Sense in Multi-Link, IEEE 802.11-20/0136r2, IEEE [online].
(Continued)

*Primary Examiner* — Hashim S Bhatti
(74) *Attorney, Agent, or Firm* — XSENSUS LLP

(57) ABSTRACT

Provided is a communication device that performs multi-link operation by synchronous transmission.
A communication device includes a communication unit that performs communication by a first link and a second link, and a control unit that controls a communication operation by the communication unit, in which the control unit sets an occupancy period of the second link on a basis of transmission suppression information of the first link. When a remaining time of a transmission suppression period of the first link is longer than a first threshold, the control unit performs control to set an occupancy period of the second link until the transmission suppression period of the first link ends and transmit a data frame by the second link.

19 Claims, 9 Drawing Sheets

(56) References Cited

U.S. PATENT DOCUMENTS

2023/0122740 A1* 4/2023 Kim .................. H04W 76/15
                                                    370/329
2023/0156606 A1* 5/2023 Kim .................. H04W 84/12
                                                    370/329

OTHER PUBLICATIONS

Matthew Fischer (Broadcom Inc), "MLO Synchronous Transmission", IEEE 802.11-20/0081.r1., Jan. 2020 (Jan. 21, 2020), pp. 1-59, XP068172608, Retrieved from the Internet, [retrieved on Jan. 21, 2020].
International Search Report and Written Opinion mailed on May 18, 2021, received for PCT Application PCT/JP2021/006949, filed on Feb. 24, 2021, 8 pages including English Translation.
Lu et al., "Multi-link Operation and Channel Access Discussion", IEEE 802.11-19/1547r4 , Jan. 12, 2020, 13 pages.
Naribole et al., "Multi-link Channel Access Discussion Follow-up", IEEE 802.11-19/1836r4, Nov. 11, 2019, 22 pages.

* cited by examiner

COMMUNICATION DEVICE AND COMMUNICATION METHOD

CROSS-REFERENCE TO RELATED APPLICATIONS

The present application is based on PCT filing PCT/JP2021/006949, filed Feb. 24, 2021, which claims priority to JP 2020-075743, filed Apr. 21, 2020, the entire contents of each are incorporated herein by reference.

TECHNICAL FIELD

The technology (hereinafter, "the present disclosure") disclosed in this specification relates to a communication device and a communication method that bundle a plurality of links to perform wireless communication.

BACKGROUND ART

In recent years, data traffic in wireless communication such as virtual reality (VR) and 8K video transmission has increased. In order to accommodate such traffic, improvement in throughput is required in a wireless local area network (LAN). Currently, a multi-link operation (MLO) for bundling a plurality of links to perform communication is being standardized as a technique useful for improving throughput. The multi-link operation can be roughly divided into an asynchronous transmission system in which each link performs an independent communication operation and a synchronous transmission system in which transmission timings are completely aligned between links. Since channels between links are close in the multi-link operation and leakage occurs, it may be difficult to perform transmission by one link and reception by another link. In this case, according to the synchronous transmission system in which the transmission timings are aligned in a plurality of links, simultaneous transmission and reception between the links does not occur, and the effect by the multi-link operation can be obtained.

When the multi-link operation by synchronous transmission is performed, it is required that all links to be used can be simultaneously transmitted, in other words, each link is simultaneously in an idle state. However, a terminal that does not support the multi-link operation, such as a legacy terminal, performs a transmission operation independently of other links by using only one link. For this reason, the time during which all the plurality of links can be transmitted by synchronous transmission in the idle state is limited, and the effect of improving the throughput by the multi-link operation cannot be expected.

For example, there has been proposed a communication device that, when a communication end time of a first communication system (legacy AP) is detected at one link used for a multi-link operation, suppresses transmission until the communication end time at the link, and transmits an occupation signal describing a media occupancy period ending at the communication end time at another link used for the multi-link operation to suppress transmission of the other communication systems, thereby securing a time during which all links used for the multi-link operation are idle (see Patent Document 1).

However, it is assumed that the communication device according to this proposal transmits a data frame by synchronous transmission after suppressing transmission until the end of communication of the first communication system by one link. For this reason, the communication device waits for transmission even if there is data desired to be transmitted by the end of communication of the first communication system. In addition, in a case where a signal indicating a media occupancy period is transmitted to suppress transmission of another communication system, the communication system that has failed in reception of the occupation signal cannot set a transmission suppression period (Network Allocation Vector: NAV) for suppressing transmission and starts transmission. Therefore, it is difficult for the communication device to secure a time during which all links used for the multi-link operation are idle. Furthermore, in order to transmit a data frame without colliding with another terminal, the communication device according to this proposal immediately transmits an occupation signal when the NAV of another communication system due to the transmission of the occupation signal expires. However, in a case where there is another communication device that similarly transmits the occupation signal at the expiration of the NAV, collision between the occupation signals occurs.

CITATION LIST

Patent Document

Patent Document 1: Japanese Patent Application Laid-Open No. 2006-303590

SUMMARY OF THE INVENTION

Problems to be Solved by the Invention

An object of the present disclosure is to provide a communication device and a communication method that perform a multi-link operation by synchronous transmission.

Solutions to Problems

The present disclosure has been made in view of the above problems, and a first aspect thereof is a communication device including:
  a communication unit that performs communication by a first link and a second link; and
  a control unit that controls a communication operation by the communication unit, in which
  the control unit sets an occupancy period of the second link on a basis of transmission suppression information of the first link.

The control unit sets an occupancy period of the second link until a transmission suppression period of the first link ends, and performs control to transmit a data frame by the second link when a remaining time of the transmission suppression period of the first link is longer than a first threshold, transmit a first signal by the second link when the remaining time of the transmission suppression period of the first link is equal to or less than the first threshold and is longer than a second threshold, and transmit a second signal by the second link when the remaining time of the transmission suppression period of the first link is equal to or less than the second threshold.

Further, the control unit determines a transmission destination of a frame by the second link on the basis of whether or not simultaneous transmission and reception between links of a transmission source or a transmission destination of a signal for setting the transmission suppression period in the first link is possible.

Further, a second aspect of the present disclosure is a communication method of a communication device that performs communication by a first link and a second link, the communication method including the steps of:

setting a transmission suppression period of the first link on a basis of a signal received by the first link; and setting the second occupancy period on a basis of the first transmission suppression information.

Effects of the Invention

According to the present disclosure, it is possible to provide a communication device and a communication method that perform a multi-link operation by synchronous transmission.

Note that the effects described in the present specification are merely examples, and the effects brought by the present disclosure are not limited thereto. Furthermore, the present disclosure may further provide additional effects in addition to the above effects.

Still other objects, features, and advantages of the present disclosure will become apparent from a more detailed description based on embodiments to be described later and the accompanying drawings.

MODE FOR CARRYING OUT THE INVENTION

Figure 1:
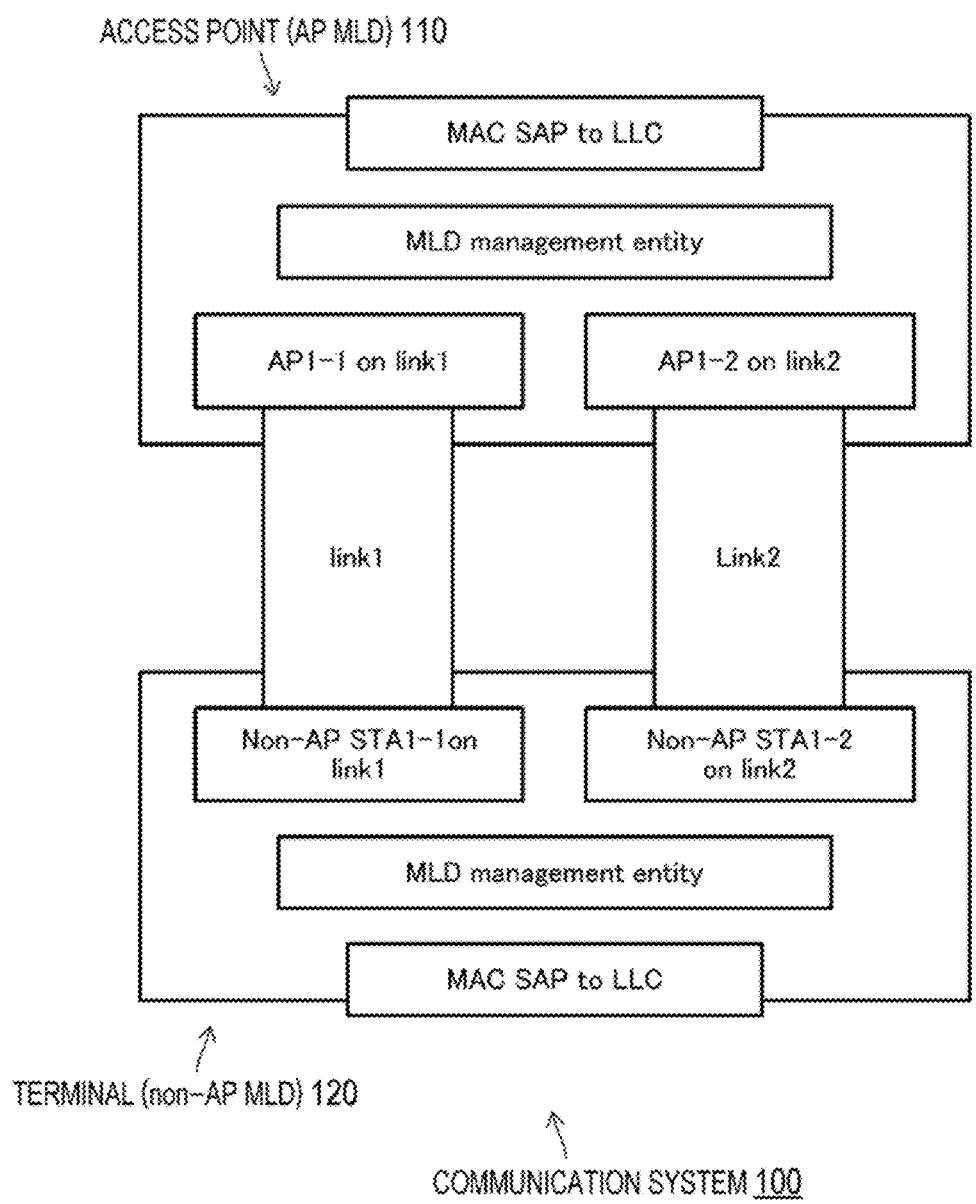
FIG. 1 is a diagram illustrating a configuration example of a communication system 100.

Hereinafter, the present disclosure will be described in the following order with reference to the drawings.

A. Overview
B. System Configuration
C. Device Configuration
D. Operation Example 1
E. Operation Example 2
F. Effect A. Overview A communication device to which the present disclosure is applied performs a multi-link operation by synchronous transmission in which transmission timings of a first link and a second link are aligned. The communication device to which the present disclosure is applied transmits data or a signal having a short signal length by the second link until the NAV ends in accordance with the length of the NAV set at the first link and the presence or absence of data to be immediately transmitted. In a case where the length of the NAV is sufficiently long, the communication device to which the present disclosure is applied can suppress transmission even in a case where another communication device cannot set the NAV by transmitting the data frame by the second link, and can secure a time during which the first link and the second link are all in the idle state. In addition, after the NAV expires, each communication device sets a preferential random waiting time, so that the communication device to which the present disclosure is applied performs preferential transmission to a communication device that does not support a multi-link operation while avoiding collision of communication between communications that perform the multi-link operation.

Furthermore, the communication device to which the present disclosure is applied may set a NAV longer than that until the end of communication of another communication device. In this case, the communication device to which the present disclosure is applied suppresses further attempt of transmission by another communication device after the end of communication by the other communication device, and easily acquires the transmission right for the multi-link operation by synchronous transmission. For example, when a communication device to which the present disclosure is applied secures a transmission right by a second link during a period in which a NAV is set by reception of a frame that is not addressed to the communication device itself by a first link, the communication device transmits a frame for setting a channel occupancy period (Transmission Opportunity: TXOP) until a time when the NAV of the first link ends in accordance with a length of the NAV of the first link, presence or absence of data to be transmitted, an amount of data, and a communication scheme such as a modulation and coding scheme (MCS) to be used. The frame may be a data frame, a request to send (RTS) frame, a clear to send (CTS)-to-self frame, a null data packet (NDP), or the like. Furthermore, the communication device to which the present disclosure is applied may set the TXOP of the second link to be longer than the end of the NAV of the first link so that transmission can be preferentially performed after the end of the NAV of the first link, and can perform transmission using the first link and the second link by channel confirmation for a certain period after the end of the NAV of the first link.

B. System Configuration

FIG. 1 schematically illustrates a configuration example of a communication system 100 to which the present disclosure is applied. The illustrated communication system 100 includes an access point (AP) 110 and a terminal (STA) 120. The terminal 120 is not an access point (that is, is a non-AP). In the communication system 100, a first link and a second link can be used, and the access point 110 and the terminal 120 are connected via the first link and the second link.

Both the access point 110 and the terminal 120 are communication devices (Multi-link Devices: MLDs) that perform the multi-link operation using the first link (link1) and the second link (link2), that is, an AP MLD and a non-AP MLD, respectively. Note that, hereinafter, when simply referred to as "multi-link operation", multi-link operation by synchronous transmission is indicated unless otherwise specified.

In the example shown in FIG. 1, two access points, AP1-1 operating on a first link and AP1-2 operating on a second link, are included in the access point 110. Also, Two terminals, a non-AP STA1-1 that operates on the first link and a non-AP STA1-2 that operates on the second link, are included in the terminal 120. However, the number of access points and terminals included in each of the access point 110 and the terminal 120 is not limited to two, and may be three or more. That is, the number of links connecting the access point 110 and the terminal 120 is not limited to two, and they may be connected through three or more links. In addition, although only one access point and one terminal are illustrated in the communication system 100 in FIG. 1 for simplification of the drawing, a plurality of access points and terminals may be connected. Furthermore, one communication device may include one or more access points (AP MLD) and one or more terminals (non-AP MLD).

An MLD management entity is an entity that manages operations in the access point 110 and the terminal 120 that are MLDs, respectively. In addition, MAC-SAP to LLC is a point (Service Access Point) that provides a service of a Media Access Control (MAC) layer to a Logical Link Control (LLC) layer, which is an upper layer of the MAC layer.

Figure 2:
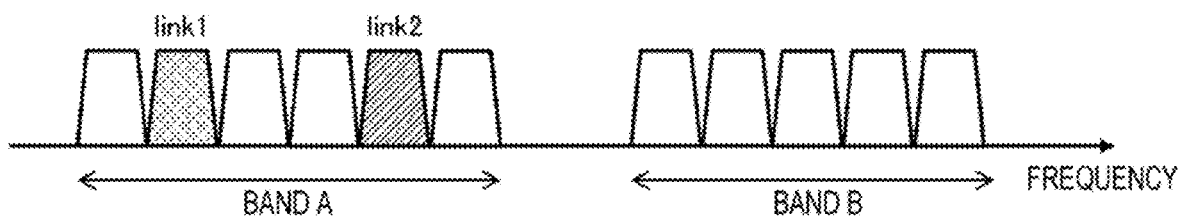
FIG. 2 is a diagram illustrating an example of channel selection of a first link (link1) and a second link (link2).
Figure 3:
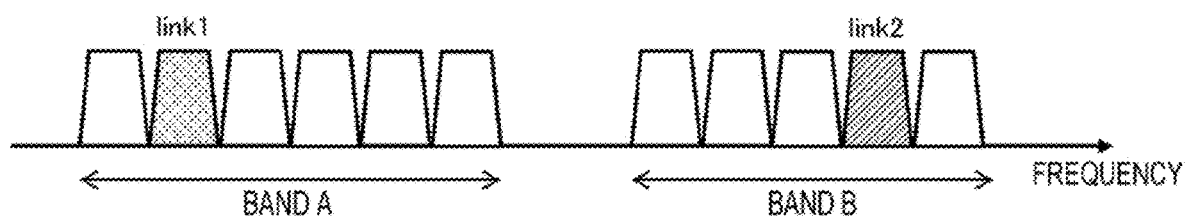
FIG. 3 is a diagram illustrating an example of channel selection of the first link (link1) and the second link (link2).

The "link" mentioned in the present specification is a wireless transmission path through which data transmission can be performed between two communication devices. The individual links are selected from among a plurality of wireless transmission paths (channels) divided, for example, in a frequency domain and independent from each other. FIGS. 2 and 3 illustrate two examples regarding channel selection of the first link (link1) and the second link (link2) used in the communication system 100. In each drawing, each of a band A and a band B is any one of bands such as a 2.4 GHz band, a 5 GHz band, a 6 GHz band, and a 920 GHz band. The band A and the band B may be, for example, an unlicensed band that does not require a radio station license, and are allowed to be used by database access such as a Spectrum Access System (SAS).

Each of the band A and the band B includes a plurality of channels. In the example illustrated in FIGS. 2 and 3, the band A includes six channels, and the band B includes five channels. The MLD such as the access point 110 and the terminal 120 operating in the communication system 100 selects channels to be used for the first link (link1) and the second link (link2) from the band A and the band B. In the example illustrated in FIG. 2, channels to be used for the first link (link1) and the second link (link2) are selected from the band A. Furthermore, in the example illustrated in FIG. 3, a channel to be used for the first link (link1) is selected from the band A, and a channel to be used for the second link (link2) is selected from the band B.

C. Device Configuration

Figure 4:
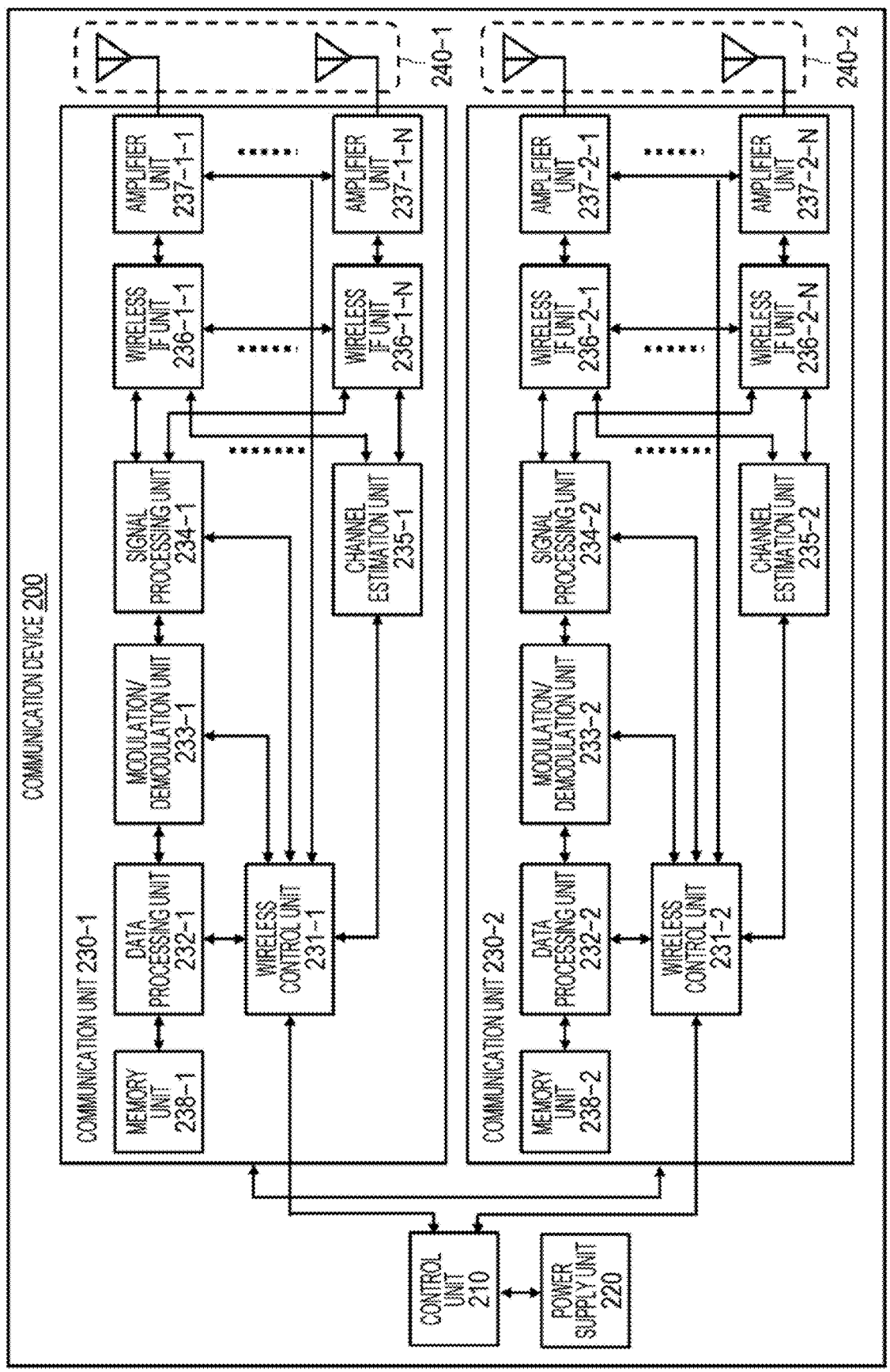
FIG. 4 is a diagram illustrating a configuration example of a communication device 200.

FIG. 4 illustrates a configuration example of the communication device 200 that can operate as the access point 110 and the terminal 120. The communication device 200 is a device or an MLD that performs a multi-link operation using a first link (link1) and a second link (link2).

The illustrated communication device 200 includes a control unit 210, a power supply unit 220, a plurality of (two in the illustrated example) communication units 230-1 and 230-2, an antenna unit 240-1 corresponding to the communication unit 230-1, and an antenna unit 240-2 corresponding to the communication unit 230-2.

The combination of the communication unit 230-1 and the antenna unit 240-1 and the combination of the communication unit 230-2 and the antenna unit 240-2 are provided for each band used by the communication device 200. In the example illustrated in FIG. 4, data communication using the first link (link1) is performed by the combination of the communication unit 230-1 and the antenna unit 240-1, and data communication using the second link (link2) is performed by the combination of the communication unit 230-2 and the antenna unit 240-2. Therefore, in a case where the communication device 200 uses three or more bands, a combination of a communication unit and an antenna unit (not illustrated) is additionally provided. The communication unit 230-1 and the communication unit 230-2 may control and exchange information with each other.

Note that, since the communication unit 230-1 and the communication unit 230-2, and the antenna unit 240-1 and the antenna unit 240-2 have the same configuration, the communication unit 230-1 and the communication unit 230-2 will be referred to as a communication unit 230, and the antenna unit 240-1 and the antenna unit 240-2 will be referred to as an antenna unit 240 for simplification.

The communication unit 230 is configured by, for example, a processor such as a microprocessor and a circuit, and includes a memory unit 238, a wireless control unit 231, a data processing unit 232, a modulation/demodulation unit 233, a signal processing unit 234, a channel estimation unit 235, a plurality of wireless interface (IF) units 236-1, . . . , and 236-N arranged in parallel, and amplifier units 237-1, . . . , and 237-N connected in series to the wireless interface units 236-1, . . . , and 236-N (here, N is an integer of 2 or more.). Then, each antenna element constituting the antenna unit 240 corresponding to the communication unit 230 is connected to each of the amplifier units 237-1, . . . , and 237-N.

With the wireless interface unit 236, the amplifier unit 237, and the antenna unit 240 connected in series as one set, one or more sets may be a component of the communication unit 230. In addition, the wireless interface units 236-1, . . . , and 236-N may include the functions of the corresponding amplifier units 237-1, . . . , and 237-N, respectively.

The memory unit 238 temporarily stores data (for example, transmission data) input from the upper layer of the communication protocol and provides the data to the data processing unit 232. In addition, the memory unit 239 temporarily stores the data (for example, received data) delivered from the data processing unit 232 and provides the data to the upper layer of the communication protocol. That is, the memory unit 238 is used as a transmission queue or a reception queue.

Note that a part or the whole of the memory unit 238 may be arranged outside the communication unit 230. Furthermore, the memory unit 238-1 arranged in one communication unit 230-1 may be shared with another communication unit 230-2, or the memory unit 238 arranged outside the communication unit 230 may be shared by a plurality of communication units 230-1, 230-2, . . . .

At the time of transmission in which data is input from an upper layer of its own communication protocol, the data processing unit 232 generates a packet for wireless transmission from the data, further performs processing such as addition of a header for media access control (MAC) or addition of an error detection code, and provides the processed data to the modulation/demodulation unit 233. Furthermore, at the time of reception in which there is an input from the modulation/demodulation unit 233, the data processing unit 232 performs processing such as analysis of the MAC header, detection of a packet error, and packet reordering, and provides the processed data to its own protocol upper layer.

The wireless control unit 231 controls delivery of information between respective units in the communication device 200. In addition, the wireless control unit 231 performs parameter setting in the modulation/demodulation unit 233 and the signal processing unit 234, packet scheduling in the data processing unit 232, parameter setting of the wireless interface unit 236 and the amplifier unit 237, and transmission power control.

At the time of transmission, the modulation/demodulation unit 233 performs encoding, interleaving, and modulation processing on the input data from the data processing unit 232 on the basis of the encoding system and the modulation system set by the wireless control unit 231, generates a data symbol stream, and provides the data symbol stream to the signal processing unit 234. Furthermore, at the time of reception, the modulation/demodulation unit 233 performs demodulation processing, deinterleaving, and decoding processing opposite to those at the time of transmission on the input symbol stream from the signal processing unit 234, and provides data to the data processing unit 232 or the wireless control unit 231.

At the time of transmission, the signal processing unit 234 performs signal processing to be used for spatial separation on the input from the modulation/demodulation unit 233 as necessary, and provides the obtained one or more transmission symbol streams to the wireless interface units 236-1, . . . . Furthermore, at the time of reception, the signal processing unit 234 performs signal processing on the received symbol streams input from the respective wireless interface units 236-1, . . . performs spatial decomposition of the streams as necessary, and provides the streams to the modulation/demodulation unit 233.

The channel estimation unit 235 calculates complex channel gain information of the propagation path from the preamble portion and the training signal portion of the input signals from the wireless interface units 236-1, . . . . . The calculated complex channel gain information is used for demodulation processing in the modulation/demodulation unit 233 and spatial processing in the signal processing unit 234 via the wireless control unit 231.

At the time of transmission, the wireless interface unit 236 converts an input from the signal processing unit 234 into an analog signal, performs filtering, up-conversion to a carrier frequency, and phase control, and transmits the resultant signal to the corresponding amplifier unit 237 or antenna unit 240. Furthermore, at the time of reception, the wireless interface unit 236 performs processing such as down-conversion, filtering, and conversion into a digital signal opposite to that at the time of transmission on the input from the corresponding amplifier unit 237 or antenna unit 240, and provides data to the signal processing unit 234 and the channel estimation unit 235.

At the time of transmission, the amplifier unit 237 amplifies the analog signal input from the wireless interface unit 236 to predetermined power and transmits the amplified analog signal to the corresponding antenna element in the antenna unit 240. Furthermore, at the time of reception, the amplifier unit 237 amplifies the signal input from the corresponding antenna element in the antenna unit 240 with low noise to predetermined power, and outputs the amplified signal to the wireless interface unit 236.

Note that at least one of the function at the time of transmission or the function at the time of reception of the amplifier unit 237 may be included in the wireless interface unit 236. Furthermore, at least one of the function at the time of transmission or the function at the time of reception of the amplifier unit 237 may be a component other than the communication unit 230.

One set of the wireless interface unit 236 and the amplifier unit 237 constitutes one radio frequency (RF) branch. It is assumed that transmission and reception of one band can be performed by one RF branch. In the device configuration example illustrated in FIG. 4, the communication unit 230 includes N RF branches.

The control unit 210 is configured by, for example, a processor such as a microprocessor and a circuit, and controls the wireless control unit 231 and the power supply unit 220. Furthermore, the control unit 210 may perform at least a part of the above-described operation of the wireless control unit 231 instead of the wireless control unit 231. In particular, in the present embodiment, the control unit 210 and the wireless control unit 231 control the operation of each unit in order to realize the operation according to each embodiment described later.

The power supply unit 220 is configured by a battery power supply or a fixed power supply, and supplies driving power to the communication device 200.

Note that the control unit 210 and the communication unit 230 can be collectively configured by one or a plurality of large scale integration (LSI).

Furthermore, while the communication device 200 is on standby, the communication unit 230 may transition to a standby state or a sleep state (alternatively, a state in which at least a part of the functions is stopped) to achieve low power consumption. In the device configuration example illustrated in FIG. 4, the communication unit 230 includes N RF branches, but may be configured to be able to transition to a standby state or a sleep state for each RF branch.

D. Operation Example 1

In this section, a first operation example of a communication device (MLD) that performs a multi-link operation using a first link and a second link will be described. Specifically, an operation in which the communication device (MLD) sets the TXOP of the second link on the basis of the NAV information of the first link, sets both the first link and the second link to the idle state, and facilitates a multi-link operation by synchronous transmission will be described.

Figure 5:
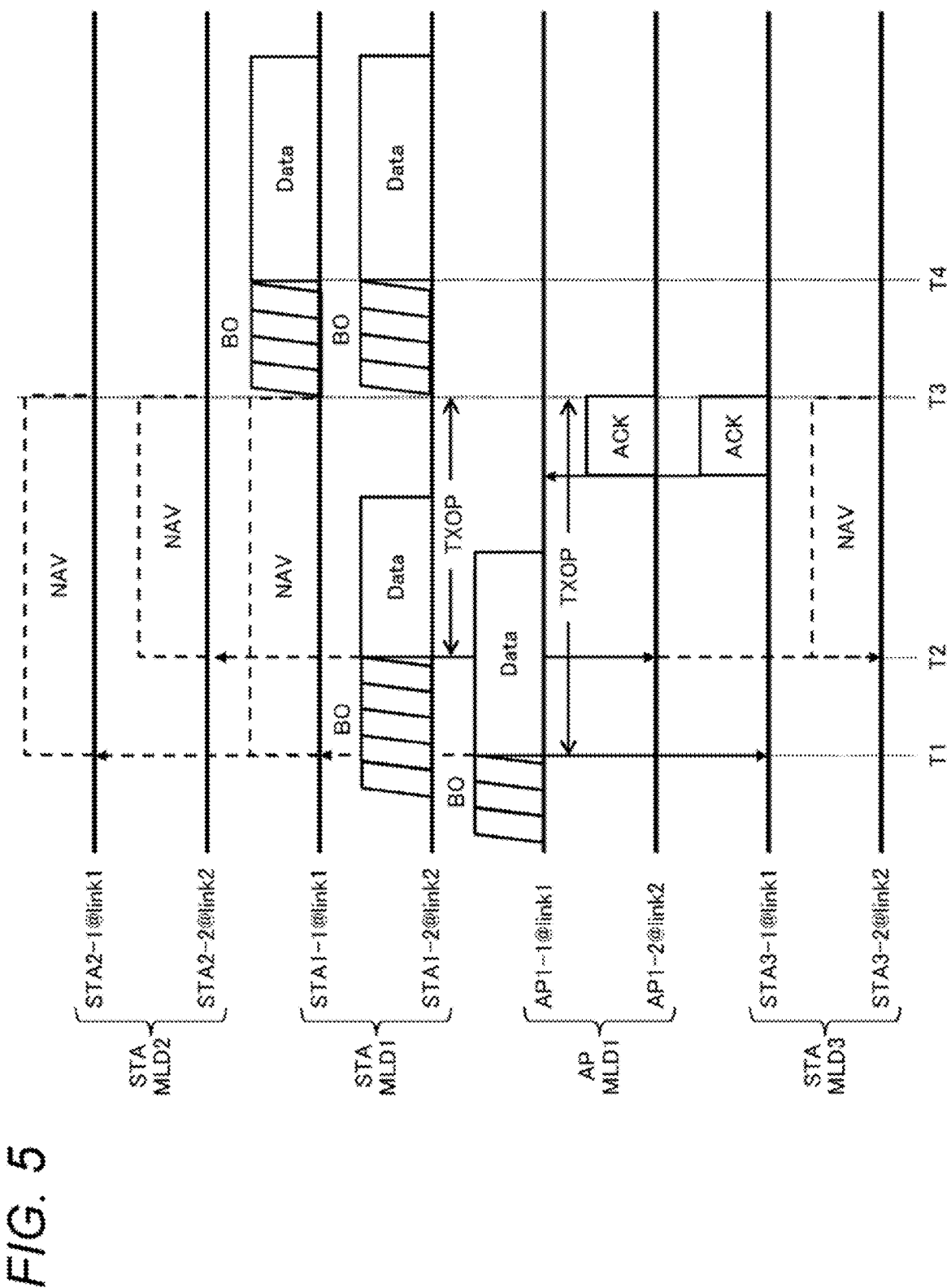
FIG. 5 is a diagram illustrating an example of a communication sequence in which a multi-link operation is performed using a first link and a second link (an example of aligning times during which respective links are idle by using data frames).

FIG. 5 illustrates a communication sequence example illustrating this operation. However, FIG. 5 assumes a communication system in which the first link (link1) and the second link (link2) can be used and three terminals (STA MLD1, STA MLD2, STA MLD3) operate under control of one access point (AP MLD1). The AP MLD1 includes an AP1-1 operating on the first link and an AP1-2 operating on the second link. In addition, the STA MLD1 includes an STAT-1 operating on the first link and an STAT-2 operating on the second link, the STA MLD2 includes an STA2-1 operating on the first link and an STA2-2 operating on the second link, and the STA MLD3 includes an STA3-1 operating on the first link and an STA3-2 operating on the second link.

Note that the horizontal axis in FIG. 5 is a time axis, and indicates a communication operation of the access point and each terminal for each time on the first link and the second link. A square block drawn by a solid line indicates a transmission frame, a solid arrow in the vertical direction indicates frame transmission to a destination, and a dotted arrow in the vertical direction indicates arrival of a frame addressed to other than the destination. In addition, a parallelogram block drawn by a solid line indicates a backoff operation, and a square block drawn by a dotted line indicates a period in which the NAV is set.

First, the AP1-1 of the AP MLD1 expires the backoff of waiting for a random waiting time, acquires a period (for example, TXOP) of occupying a channel at the first link (link1) at time T1, and transmits a data frame (Data) to the STA MLD3-1.

When receiving a data frame that is not addressed to the STA1-1 and the STA2-1 from the AP1-1, the STAT-1 and the STA2-1 set a transmission suppression period (NAV) until time T3 at which returning of a reception acknowledgement (ACK) from the STA3-1 to the AP3-1 is completed on the basis of the time described in the Duration/ID field of the header of the data frame, and perform transmission suppression of the frame at the first link (link1). The time information used to set the transmission suppression period may be a length field or a TXOP DURATION of Extreme High Throughput (EHT)-SIG (SIGNAL).

Thereafter, the STA1-2 expires the backoff at the second link (link2) at time T2. The STA1-2 may attempt to acquire the transmission right after the STA1-1 receives the data frame not addressed to the STA1-1 itself, but in the example illustrated in FIG. 5, the STA1-2 starts backoff before the STA1-1 receives the data frame not addressed to the STA1-1 itself. The STA1-2 sets TXOP at the second link (link2) in accordance with the time until the end of the NAV of the STA1-1, the presence or absence of data to be transmitted before the end of the NAV of the STA1-1, the amount of data, and the modulation and coding scheme (MCS) to be used.

In the example illustrated in FIG. 5, since there is data to be transmitted before the end of the NAV of the STA1-1, the STA1-2 sets TXOP by time T3 corresponding to the NAV end time of the STA1-1, and transmits a data frame (Data) to the AP1-2 at time T2 when the backoff expires.

Here, in a case where the time until the time T3 at which the NAV of the STA1-1 ends is longer than the first threshold, the STA1-2 sets TXOP by the NAV end time T3 of the STA1-1 and transmits the data frame as illustrated in FIG. 5. The first threshold here is a time length determined according to the amount of data of the data frame to be transmitted by the STAT-2 and the MCS to be used.

Furthermore, in a case where the time until the NAV end time T3 of the STAT-1 is shorter than the first threshold and longer than the second threshold, the STA1-2 sets TXOP until the NAV end time T3 of the STAT-1, and transmits a signal having a short signal length instead of the data frame. Here, the signal having a short signal length is an RTS frame or a CTS-to-self frame. Furthermore, the second threshold is a time length determined according to the frame length of the RTS frame or the CTS-to-self frame transmitted by the STAT-2 and the MCS to be used.

Figure 6:
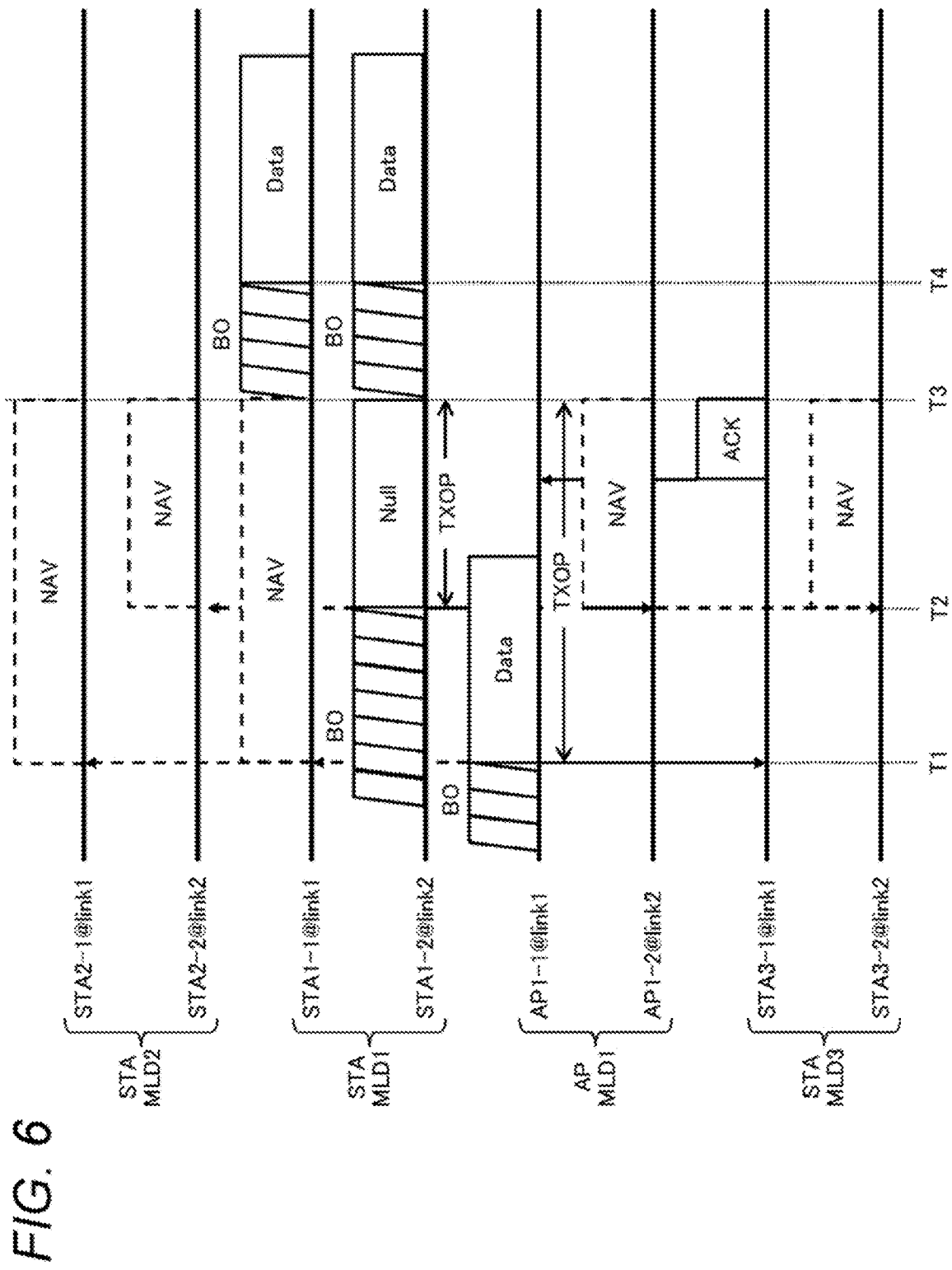
FIG. 6 is a diagram illustrating an example of a communication sequence in which a multi-link operation is performed by using a first link and a second link (an example of aligning times during which respective links are idle by using null packets).

Furthermore, in a case where the time until the NAV end time T3 of the STAT-1 is shorter than the second threshold, the STAT-2 sets TXOP by the NAV end time T3 of the STAT-1 and transmits null packets instead of the data frame. FIG. 6 illustrates, as a modification of the communication sequence illustrated in FIG. 5, a communication sequence example in which the STAT-2 aligns the time during which the first link and the second link are idle using null packets. The null packet may be, for example, a Very High Throughput (VHT) NDP or a High Efficiency (HE) NDP. Furthermore, the packet may be a packet including only a legacy preamble such as L-STF (Legacy Short Training Field) or L-LTF (Long Training Field), or a packet including only a legacy preamble and subjected to padding until the NAV end time. In a case where the time until the NAV end time T3 of the STAT-1 is shorter than the time related to the transmission of the null packet, the STAT-2 may set the NAV until the NAV end time T3 of the STAT-1 without transmitting the null packet.

The communication sequence example will be described with reference to FIG. 5 again. The STA2-2 and the STA3-2, when receiving a data frame that is not addressed to the STA2-2 and STA3-2 from the STAT-2, set a transmission suppression period (NAV) on the basis of the time described in the Duration/ID field of the header of the data frame, and perform frame transmission suppression at the second link (link2) until time T3.

In this way, the STA MLD1 can align the time during which the first link and the second link are idle at time T3. The STAT-1 and the STAT-2 may start backoff at time T3 by setting the same random waiting time. Then, when the backoff expires at time T4, the STAT-1 and the STAT-2 transmit data frames (Data) using the first link and the second link, respectively, and can realize a multi-link operation by synchronous transmission (the same applies to the communication sequence illustrated in FIG. 6).

In the communication sequence illustrated in FIG. 5, when transmitting a data frame at time T2, the STAT-2 may determine the destination of the data frame to be transmitted by link2 by using information as to whether a transmission source (Transmitter Address) and a transmission destination (Receiver Address) of a frame for which a NAV is set support simultaneous transmission and reception between links. In the communication sequence example illustrated in FIG. 5, in a case where the AP MLD1 does not support simultaneous transmission and reception between links, when the STA1-2 transmits a data frame to the AP1-2, the AP MLD1 fails to receive data by the AP1-2 due to interlink interference from data transmission at the AP1-1. Furthermore, in a case where the STA1-1 sets NAV by a data frame transmitted from another STA (for example, STA3-1) to the AP (for example, AP1-1), even if the STA1-2 transmits data to the AP1-2, AP1-2 fails to receive the data due to interference caused by ACK transmission from the AP1-1 to the STA3-1. Therefore, the STA1-2 transmits a data frame to another STA instead of the AP1-2 that does not support simultaneous reception, or performs only transmission of a CTS-to-self frame.

In short, when a communication device (MLD) that performs a multi-link operation using the first link and the second link acquires a transmission right by the other link during a period in which the NAV is set by one link, the communication device transmits a data frame, a signal having a short signal length, or a null packet by the other link according to a time until the NAV end time, thereby aligning a time during which the first link and the second link are idle and realizing the multi-link operation by synchronous transmission.

An EHT STA that satisfies all of the following conditions (1) to (3) continues to acquire, at one link for which an AP MLD or a non-AP MLD has acquired the transmission right (or has become a TXOP holder), the transmission right for one link until the same time as the time when NAV set by the AP MLD or non-AP MLD for another link ends.

(1) A multi-link support subfield of an EHT Capability Information field is set to 1, and a multi-link simultaneously transmit and receive support subfield of the EHT Capability Information field is set to 0.

(2) At a link that is not the link having become the TXOP holder, the NAV is set on the basis of the length field, the Duration/ID field, and the TXOP_DURATION of the EHT-SIG of a frame in which the address of the RA field does not match its own MAC address.

(3) The frame is held in a queue corresponding to an access category (AC) that has become a TXOP holder on the basis of Enhanced Distributed Channel Access (EDCA) that transmits the frame on the basis of the priority.

Figure 7:
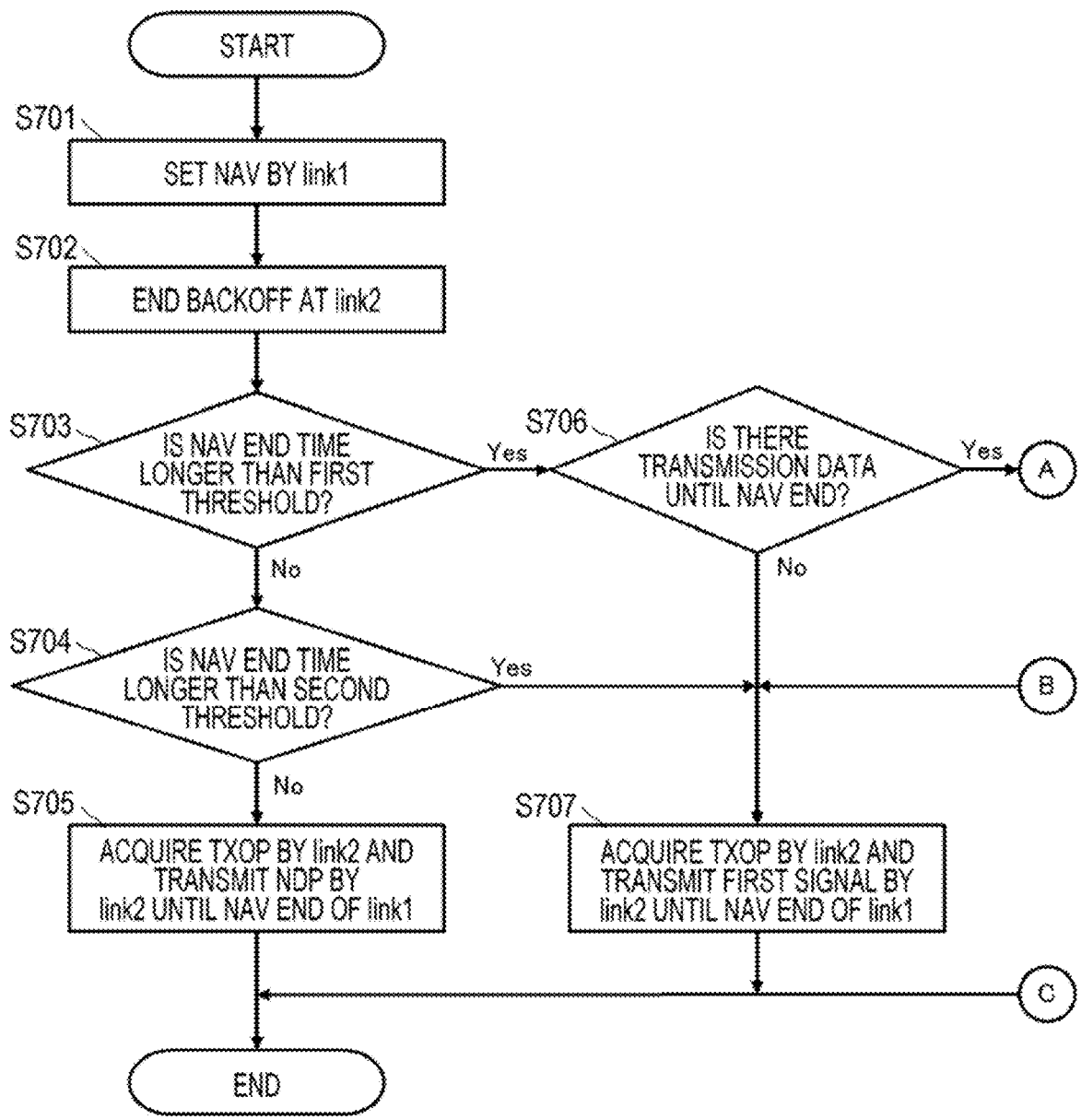
FIG. 7 is a flowchart illustrating a processing procedure for a communication device capable of performing a multi-link operation to transmit a data frame.
Figure 8:
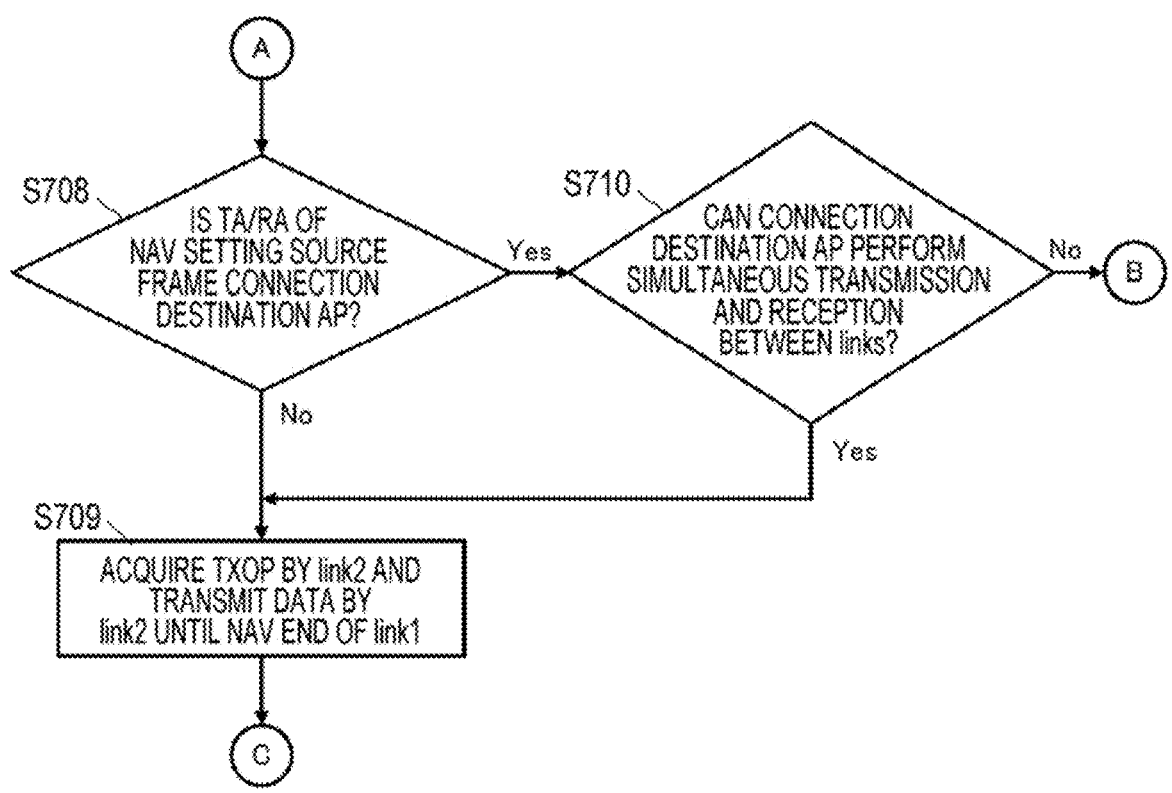
FIG. 8 is a flowchart illustrating a processing procedure for a communication device capable of performing a multi-link operation to transmit a data frame.

FIGS. 7 and 8 illustrate a processing procedure for a communication device (MLD) capable of performing a multi-link operation using a first link and a second link to transmit a data frame in the form of a flowchart. FIGS. 7 and 8 illustrate a processing procedure in which the communication device (MLD) acquires the transmission right (TXOP) at the second link (link2) during the period in which the NAV is set at the first link (link1), and aligns the time during which the first link and the second link are idle.

When the backoff ends at the link2 (step S702) during the period in which the NAV is set at the link1 (step S701), the MLD checks whether the time until the NAV of the link1 ends is longer than a first threshold (step S703). The first threshold is a time length determined according to the amount of data of the data frame to be transmitted by the MLD and the MCS to be used.

In a case where the time until the NAV of the link1 ends is equal to or less than the first threshold (No in step S703), the MLD further checks whether the time until the NAV of the link1 ends is longer than a second threshold (step S704). The second threshold is a time length determined according to the amount of data of a signal having a short signal length such as an RTS frame or a CTS-to-self frame and the MCS to be used.

In a case where the time until the NAV of the link1 ends is equal to or less than the second threshold (No in step S704), the MLD acquires the transmission right (TXOP) at the link2 and transmits the null packet (NDP) by the link2 until the time when the NAV set at the link1 ends (step S705).

In a case where the time until the NAV of the link1 ends is longer than the first threshold (Yes in step S703), the MLD subsequently checks whether there is data to be transmitted before the NAV of the link1 ends (step In a case where there is data to be transmitted before the NAV of the link1 ends (Yes in step S706), the MLD further checks whether a transmission source and a transmission destination of the frame that is the source in which the NAV is set at the link1 are access points (AP MLD) of a connection destination (step S708).

In a case where the transmission source and the transmission destination of the frame that is the source in which the NAV is set at the link1 are the access points (AP MLD) of the connection destination (Yes in step S708), the MLD further checks whether the AP MLD of the connection destination can perform simultaneous transmission and reception by the link1 and the link2 (step S710).

In a case where there is no data to be transmitted before the NAV of the link1 ends (No in step S706), if the time until the NAV of the link1 ends is equal to or less than the first threshold but is longer than the second threshold (Yes in step S704), and if the AP MLD of the connection destination cannot perform simultaneous transmission and reception by the link1 and link2 (No in step S710), the MLD acquires the transmission right (TXOP) at the link2 and transmits the first signal by the link2 until the time when the NAV set at the link1 ends (step S707). The first signal is a signal having a short signal length, such as an RTS frame or a CTS-to-self frame.

Further, in a case where the transmission source and transmission destination of the frame that is the source in which the NAV is set at the link1 are not AP MLD of the connection destination (Yes in step S708), or in a case where the AP MLD of the connection destination can simultaneously transmit and receive the frame by the link1 and the link2 (Yes in step S710), the MLD acquires the transmission right (TXOP) at the link2 and transmits the data frame by the link2 until the time when the NAV set at the link1 ends (step S709).

According to the above processing procedure, when the NAV set by the MLD at the link1 ends, both the link1 and the link2 become idle, and thus the MLD can perform the multi-link operation by synchronous transmission using the link1 and the link2.

For example, the STA MLD1 in the communication sequence illustrated in FIGS. 5 and 6 operates according to the processing procedure illustrated in FIGS. 7 and 8.

E. Operation Example 2

Next, a second operation example of the communication device (MLD) that performs a multi-link operation using the first link and the second link will be described. Also in the second operation example, the communication device (MLD) sets the TXOP of the second link on the basis of NAV information of the first link, sets both the first link and the second link to the idle state, and facilitates the multi-link operation by synchronous transmission.

Figure 9:
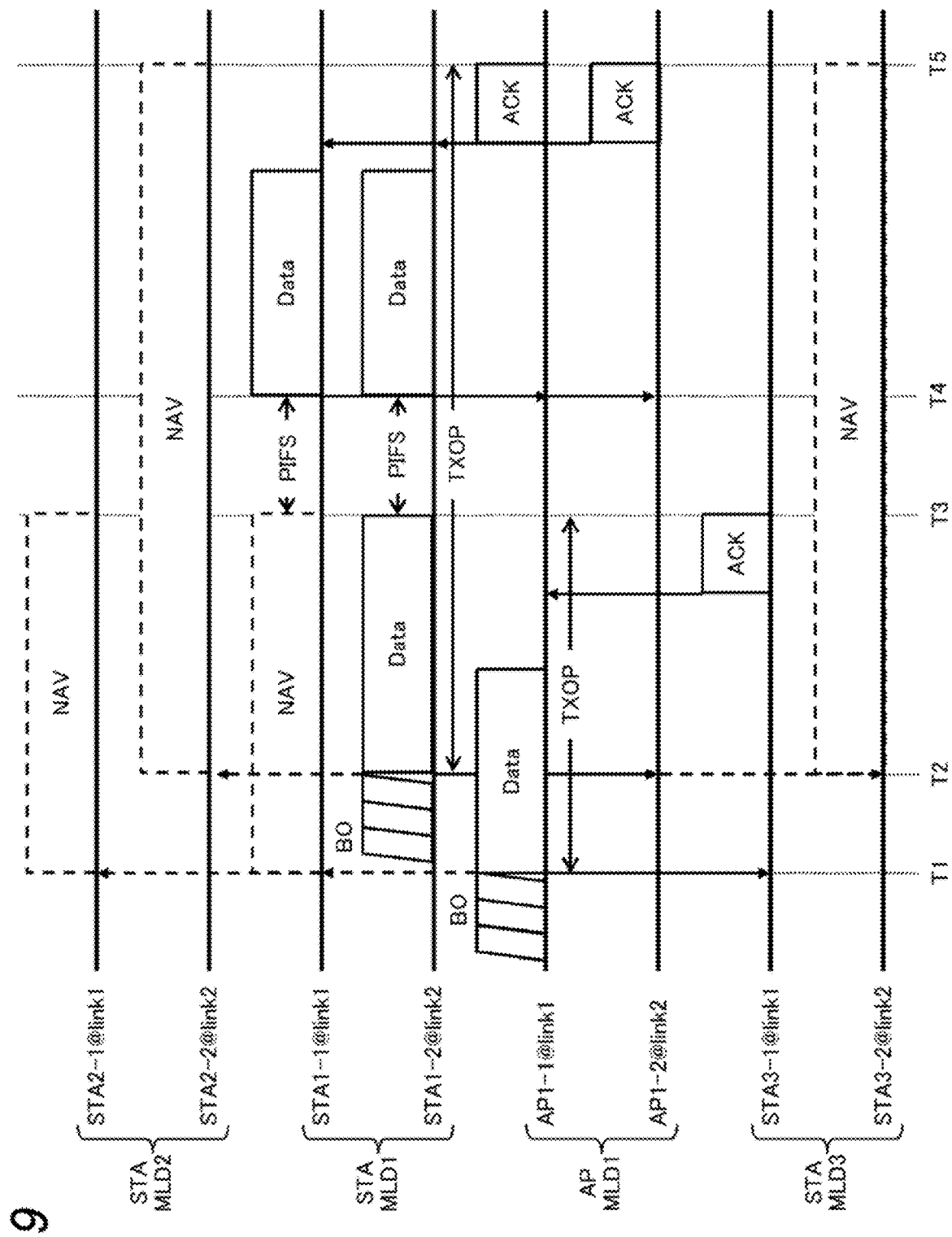
FIG. 9 is a diagram illustrating an example of a communication sequence in which a multi-link operation is performed using a first link and a second link.

FIG. 9 illustrates a communication sequence example illustrating this operation. Also, FIG. 9 assumes a communication system in which the first link (link1) and the second link (link2) can be used and three terminals (STA MLD1, STA MLD2, STA MLD3) operate under the control of one access point (AP MLD1). The AP MLD1 includes an AP1-1 operating on the first link and an AP1-2 operating on the second link. In addition, the STA MLD1 includes an STAT-1 operating on the first link and an STAT-2 operating on the second link, the STA MLD2 includes an STA2-1 operating on the first link and an STA2-2 operating on the second link, and the STA MLD3 includes an STA3-1 operating on the first link and an STA3-2 operating on the second link.

In addition, a horizontal axis in FIG. 9 is a time axis, and indicates a communication operation for each time on the first link and the second link of the access point and each terminal. Note that a square block drawn by a solid line indicates a transmission frame, a solid arrow in the vertical direction indicates frame transmission to a destination, and a dotted arrow in the vertical direction indicates arrival of a frame to other than the destination. A parallelogram block drawn by a solid line indicates a backoff operation, and a square block drawn by a dotted line indicates a period in which the NAV is set.

First, the AP1-1 of the AP MLD1 expires the backoff of waiting for a random waiting time, acquires a period (for example, TXOP) of occupying a channel at the first link (link1) at time T1, and transmits a data frame (Data) to the STA MLD3-1.

When receiving a data frame that is not addressed to the STA1-1 and the STA2-1 from the AP1-1, the STAT-1 and the STA2-1 set a transmission suppression period (NAV) until time T3 at which returning of a reception acknowledgement (ACK) from the STA3-1 to the AP3-1 is completed on the basis of the time described in the Duration/ID field of the header of the data frame, and perform transmission suppression of the frame at the first link (link1). The time information used to set the transmission suppression period may be a length field or a TXOP DURATION of Extreme High Throughput (EHT)-SIG (SIGNAL).

Thereafter, the STAT-2 expires the backoff at the second link (link2) at time T2. The STAT-2 may start the backoff before the STAT-1 receives the data frame not addressed to the STAT-1 itself, but in the example illustrated in FIG. 9, the STAT-2 attempts to acquire the transmission right after the STAT-1 receives the data frame not addressed to the STAT-1 itself. The STAT-2 sets, at link2, a TXOP longer than time T3 at which the NAV of the STAT-1 ends, and transmits the first data frame until the NAV end time of the link1. In the example illustrated in FIG. 9, a period until time T5 at which reception of the ACK from the transmission destination for the data frame transmitted second by the STAT-2 is completed is set as TXOP at link2.

When the STA2-2 and the STA3-2 receive a data frame that is not addressed to themselves and is first transmitted by the STA1-2, the STA2-2 and the STA3-2 set a transmission suppression period (NAV) on the basis of the time described in the Duration/ID field of the header of the data frame, and perform frame transmission suppression at the second link (link2) until time T5.

The STA1-2 may adjust the data length and transmit the data frame so that transmission of the first data frame after acquiring the TXOP at time T2 or reception of the ACK for the data frame from the transmission destination ends at end time T3 of the NAV set at the link1. In a case where the transmission of the first data frame or the reception of the ACK for the data frame from the transmission destination cannot be completed by the end time T3 of the NAV set at the link1 the STA1-2 may transmit a null packet in which the time until the completion of the transmission of the next data frame is described in the Duration/ID field.

Then, after the NAV set at the link1 by the STA1-1 ends at the time T3, the STA1-1 and the STA1-2 confirm whether the link1 and the link2 are idle for a first time, respectively.

The first time here is, for example, a Short Interframe Space (SIFS), a Point coordination function IFS (PIFS), or a SIFS+Random ( )×SlotTime. Random ( ) is an integer uniformly and randomly determined from a certain range. The first time may be a time common between the link1 and the link2, or may be set to a different time according to a transmission situation or the like at each link. Assuming that in addition to the STA MLD1, there is a terminal that sets a NAV at the link1 by a data frame transmitted by the AP1-1 to the STA3-1 and intends to perform a multi-link operation using the link1 and the link2 after the NAV ends, the first time may be set as a random waiting time in order to avoid a collision between terminals. In the example illustrated in FIG. 9, the PIFS is used in the first time at both link1 and link2.

In this way, the STA MLD1 can align the time during which the first link and the second link are idle at time T3. Then, at time T4 at which the first time has elapsed from time T3, the STAT-1 and the STAT-2 transmit data frames (Data) using link1 and link2, respectively, and can realize the multi-link operation by synchronous transmission. In the example illustrated in FIG. 9, the STAT-1 and the STAT-2 transmit data frames to the AP1-1 and the AP1-2 using link1 and link2, respectively. Then, after completing the reception of the data frames, the AP1-1 and the AP1-2 return the ACK using link1 and link2, respectively.

Figure 10:
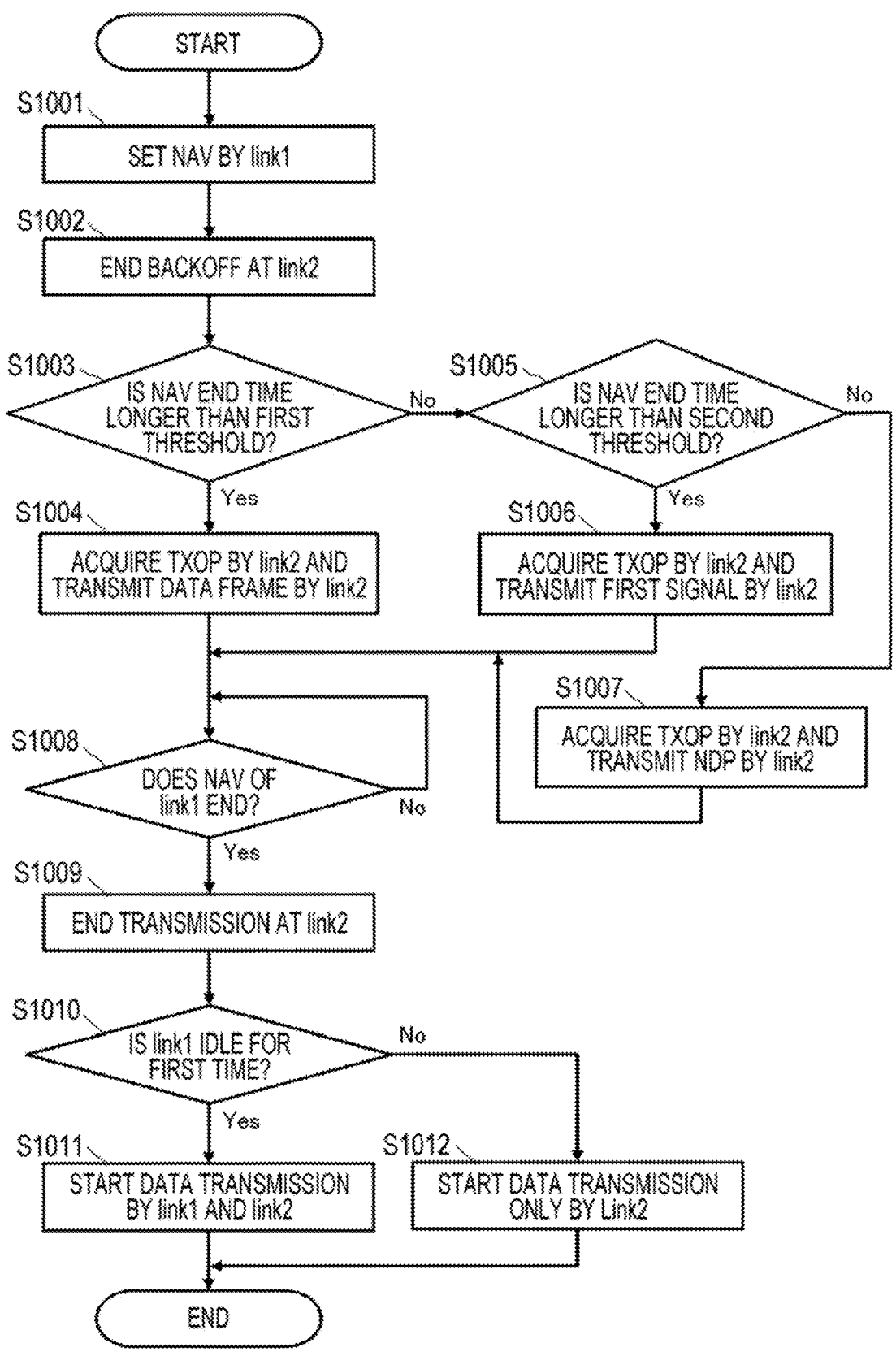
FIG. 10 is a flowchart illustrating a processing procedure for a communication device capable of performing a multi-link operation to transmit a data frame.

FIG. 10 illustrates a processing procedure for a communication device (MLD) capable of performing a multi-link operation using the first link and the second link to transmit a data frame in the form of a flowchart.

When the backoff ends at the link2 (step 1002) during the period in which the NAV is set at the link1 (step S1001), the MLD checks whether the time until the NAV of the link1 ends is longer than the first threshold (step S1003). The first threshold is a time length determined according to the amount of data of the data frame to be transmitted by the MLD and the MCS to be used.

In a case where the time until the NAV of the link1 ends is longer than the first threshold (Yes in step S1003), the MLD sets TXOP at link2, and transmits the data frame by the link2 until the NAV end time of the link1 (step S1004). The first threshold is a time length determined according to the amount of data of the data frame transmitted first by the MLD and the MCS to be used. In addition, in 51004, the MLD sets the TXOP of the link2 to be longer than the NAV end of the link1.

Furthermore, in a case where the time until the NAV of the link1 ends is equal to or less than the first threshold (No in step S1003), the MLD further checks whether the time until the NAV of the link1 ends is longer than a second threshold (step S1005). The second threshold is a time length determined according to the amount of data of a signal having a short signal length such as an RTS frame or a CTS-to-self frame and the MCS to be used.

In a case where the time until the NAV of the link1 ends is longer than the second threshold (Yes in step S1005), the MLD sets TXOP at link2, and transmits a first signal by the link2 until the NAV end time of the link1 (step S1006). The first signal is a signal having a short signal length, such as an RTS frame or a CTS-to-self frame. In addition, in S1006, the MLD sets the TXOP of the link2 to be longer than the NAV end of the link1.

Furthermore, in a case where the time until the NAV of the link1 ends is equal to or less than the second threshold (No in step S1005), the MLD sets the TXOP at link2 and transmits the null packet (NDP) by the link2 until the NAV end time of the link1 (step S1007). In S1007, the MLD sets the TXOP of the link2 to be longer than the NAV end of the link1.

Thereafter, the MLD waits until the NAV set at the link1 ends (No in step S1008). Then, the MLD waits until the NAV set at the link1 ends (Yes in step S1008), and when the transmission in step S1004, S1006, or S1007 ends at the link2 (step S1009), the MLD checks whether the link1 is idle for a first time (step S1010).

In a case where it is confirmed that the link1 is idle for the first time (Yes in step S1010), the MLD starts data transmission by the link1 and the link2 and performs the multi-link operation (step S1011). As a result, it is possible to increase the probability that the multi-link operation can be performed using the link1 and the link2.

In addition, in a case where it is not confirmed that the link1 is idle for the first time (No in step S1010), the MLD starts data transmission only by the link2 (step S1012), and does not perform the multi-link operation.

F. Effect

Effects brought by the present disclosure will be summarized.

(1) By setting the TXOP of another link on the basis of the NAV information set at one link, the communication device (MLD) can align the time when each link is idle, and thus, it is easy to perform a multi-link operation by synchronous transmission.

(2) The communication device (MLD) determines a transmission destination of data according to capability of simultaneous transmission and reception between links of surrounding terminals. For example, when a transmission right is acquired by another terminal before the end of the NAV set at one link, the communication device (MLD) determines a terminal that supports simultaneous transmission and reception as a data transmission destination. As a result, it is possible to avoid data reception failure due to inter-link interference in a terminal that does not support simultaneous transmission and reception.

(3) After the NAV set at one link ends, the communication device (MLD) performs channel confirmation for a certain period of time, and then simultaneously starts data transmission at each link. As a result, it is possible to increase the probability that the multi-link operation using each link can be performed.

INDUSTRIAL APPLICABILITY

The present disclosure has been described in detail above with reference to specific embodiments. However, it is obvious that those skilled in the art can make modifications and substitutions of the embodiments without departing from the gist of the present disclosure.

For example, by applying the present disclosure to a wireless LAN system conforming to the IEEE 802.11 standard, a communication device (MLD) that implements a multi-link function can easily perform a multi-link operation by synchronous transmission, and can achieve a high throughput.

In short, the present disclosure has been described in the form of exemplification, and the contents described in the present specification should not be interpreted in a limited manner. In order to determine the gist of the present disclosure, the claims should be taken into consideration.

Note that the present disclosure can also have the following configurations.

(1) A communication device including:
a communication unit that performs communication by a first link and a second link;
a control unit that controls a communication operation by the communication unit, in which
the control unit sets an occupancy period of the second link on the basis of transmission suppression information of the first link.

(2) The communication device according to (1), in which
the control unit controls a transmission operation at a second link on the basis of a remaining time of a transmission suppression period of the first link.

(3) The communication device according to (1) or (2), in which
when the remaining time of the transmission suppression period of the first link is longer than a first threshold, the control unit performs control to set an occupancy period of the second link until the transmission suppression period of the first link ends and transmit a data frame by the second link.

(4) The communication device according to (3), in which
the first threshold is a value determined on the basis of an amount of data to be transmitted by the second link.

(5) The communication device according to (3) or (4), in which
when the remaining time of the transmission suppression period of the first link is equal to or less than the first threshold and is longer than a second threshold, the control unit performs control to set an occupancy period of the second link until the transmission suppression period of the first link ends and transmit a first signal by the second link.

(6) The communication device according to (5), in which
the second threshold is a value determined on the basis of a signal length of the first signal.

(7) The communication device according to (5) or (6), in which
the first signal is an RTS frame or a CTS-to-self frame.

(8) The communication device according to any one of (5) to (7), in which
when the remaining time of the transmission suppression period of the first link is equal to or less than the second threshold, the control unit performs control to set an occupancy period of the second link until the transmission suppression period of the first link ends and transmit a second signal by the second link.

(9) The communication device according to (8), in which
the second signal is a null packet.

(10) The communication device according to any one of (1) to (9), in which
the control unit determines a transmission destination of a frame by the second link on the basis of whether or not simultaneous transmission and reception between links of a transmission source or a transmission destination of a signal for setting a transmission suppression period at the first link is possible.

(11) The communication device according to (1) or (2), in which
the control unit sets the second occupancy period longer than the transmission suppression period of the first link.

(12) The communication device according to (11), in which
when the remaining time of the transmission suppression period of the first link is longer than a first threshold, the control unit performs control to transmit a data frame by the second link until the transmission suppression period of the first link ends.

(13) The communication device according to (12), in which
when the remaining time of the transmission suppression period of the first link is equal to or less than the first threshold and is longer than a second threshold, the control unit performs control to transmit a first signal by the second link until the transmission suppression period of the first link ends.

(14) The communication device according to (13), in which
when the remaining time of the transmission suppression period of the first link is equal to or less than the second threshold, the control unit performs control to transmit a second signal by the second link until the transmission suppression period of the first link ends.

(15) The communication device according to any one of (11) to (14), in which
the control unit checks whether or not transmission can be performed by the first link for a first time when the transmission suppression period of the first link ends, and performs control to transmit a data frame by using the first link and the second link when it is determined that transmission can be performed.

(16) A communication method of a communication device that performs communication by a first link and a second link, the communication method including the steps of:
setting a transmission suppression period of the first link on the basis of a signal received by the first link; and
setting the second occupancy period on the basis of the first transmission suppression information.

REFERENCE SIGNS LIST

100 Communication system
110 Access point
120 Terminal
200 Communication device
210 Control unit
220 Power supply unit
230 Communication unit
231 Wireless control unit
232 Data processing unit
233 Modulation/demodulation unit
234 Signal processing unit
235 Channel estimation unit
236 Wireless interface unit
237 Amplifier unit
238 Memory unit
240 Antenna unit

The invention claimed is:

1. A communication device comprising:
first processing circuitry configured to perform communication by a first link and a second link; and
second processing circuitry configured to control a communication operation by the first processing circuitry, wherein
the second processing circuitry is configured to:
set an occupancy period of the second link on a basis of transmission suppression information of the first link, and
determine a transmission destination of a frame by the second link on a basis of whether or not simultaneous transmission and reception between links of a transmission source or a transmission destination of a signal for setting a transmission suppression period at the first link is possible.

2. The communication device according to claim 1, wherein the second processing circuitry is configured to control a transmission operation at the second link on a basis of a remaining time of a transmission suppression period of the first link.

3. The communication device according to claim 1, wherein
when a remaining time of a transmission suppression period of the first link is longer than a first threshold, the second processing circuitry is configured to perform control to set the occupancy period of the second link until the transmission suppression period of the first link ends and transmit a data frame by the second link.

4. The communication device according to claim 3, wherein the first threshold is a value determined on a basis of an amount of data to be transmitted by the second link.

5. The communication device according to claim 3, wherein
when the remaining time of the transmission suppression period of the first link is equal to or less than the first threshold and is longer than a second threshold, the second processing circuitry is configured to perform control to set the occupancy period of the second link until the transmission suppression period of the first link ends and transmit a first signal by the second link.

6. The communication device according to claim 5, wherein the second threshold is a value determined on a basis of a signal length of the first signal.

7. The communication device according to claim 5, wherein the first signal is an RTS frame or a CTS-to-self frame.

8. The communication device according to claim 5, wherein
when the remaining time of the transmission suppression period of the first link is equal to or less than the second threshold, the second processing circuitry is configured to perform control to set the occupancy period of the second link until the transmission suppression period of the first link ends and transmit a second signal by the second link.

9. The communication device according to claim 8, wherein the second signal is a null packet.

10. The communication device according to claim 1, wherein the second processing circuitry is configured to set the occupancy period of the second link longer than a transmission suppression period of the first link.

11. The communication device according to claim 10, wherein
when a remaining time of the transmission suppression period of the first link is longer than a first threshold, the second processing circuitry is configured to perform control to transmit a data frame by the second link until the transmission suppression period of the first link ends.

12. The communication device according to claim 11, wherein
when the remaining time of the transmission suppression period of the first link is equal to or less than the first threshold and is longer than a second threshold, the second processing circuitry is configured to perform control to transmit a first signal by the second link until the transmission suppression period of the first link ends.

13. The communication device according to claim 12, wherein
when the remaining time of the transmission suppression period of the first link is equal to or less than the second threshold, the second processing circuitry is configured to perform control to transmit a second signal by the second link until the transmission suppression period of the first link ends.

14. The communication device according to claim 10, wherein the second processing circuitry is configured to:
check whether or not transmission can be performed by the first link for a first time when the transmission suppression period of the first link ends, and
perform control to transmit a data frame by using the first link and the second link when it is determined that transmission can be performed.

15. A communication method of a communication device that performs communication by a first link and a second link, the communication method comprising:
setting an occupancy period of the second link on a basis of transmission suppression information of the first link; and
determining a transmission destination of a frame by the second link on a basis of whether or not simultaneous transmission and reception between links of a transmission source or a transmission destination of a signal for setting a transmission suppression period at the first link is possible.

16. The communication method according to claim 15, further comprising controlling a transmission operation at the second link on a basis of a remaining time of a transmission suppression period of the first link.

17. The communication method according to claim 15, wherein
when a remaining time of a transmission suppression period of the first link is longer than a first threshold, the method further comprises performing control to set the occupancy period of the second link until the transmission suppression period of the first link ends and transmit a data frame by the second link.

18. The communication method according to claim 17, wherein the first threshold is a value determined on a basis of an amount of data to be transmitted by the second link.

19. The communication method according to claim 17, wherein
when the remaining time of the transmission suppression period of the first link is equal to or less than the first threshold and is longer than a second threshold, the method further comprises performing control to set the occupancy period of the second link until the transmission suppression period of the first link ends and transmit a first signal by the second link.

\* \* \* \* \*